US011650578B2

(12) United States Patent
Behandish et al.

(10) Patent No.: US 11,650,578 B2
(45) Date of Patent: May 16, 2023

(54) METHOD AND SYSTEM FOR REPRESENTATION-AGNOSTIC COMPOSITION OF HYBRID MANUFACTURING SERVICES

(71) Applicant: Palo Alto Research Center Incorporated, Palo Alto, CA (US)

(72) Inventors: Morad Behandish, Mountain View, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/397,499

(22) Filed: Aug. 9, 2021

(65) Prior Publication Data

US 2023/0041509 A1 Feb. 9, 2023

(51) Int. Cl.
*G05B 19/418* (2006.01)

(52) U.S. Cl.
CPC ..... *G05B 19/4188* (2013.01); *G05B 19/4183* (2013.01); *G05B 19/41885* (2013.01)

(58) Field of Classification Search
CPC ............ G05B 19/4188; G05B 19/4183; G05B 19/41885
See application file for complete search history.

(56) References Cited

U.S. PATENT DOCUMENTS

| 10,359,764 | B1 | 7/2019 | Nelaturi et al. |
| 10,719,069 | B2 | 7/2020 | Behandish et al. |
| 2004/0107019 | A1* | 6/2004 | Keshavmurthy .. G05B 19/4097 700/118 |
| 2019/0197448 | A1 | 6/2019 | Nelaturi et al. |
| 2019/0204813 | A1* | 7/2019 | Behandish .............. G06F 30/17 |
| 2020/0264589 | A1* | 8/2020 | Reinhart .......... G05B 19/41865 |

OTHER PUBLICATIONS

Stavropoulos, P., Bikas, H., Avram, O. et al. Hybrid subtractive-additive manufacturing processes for high value-added metal components. Int J Adv Manuf Technol 111, 645-655 (2020). https://doi.org/10.1007/s00170-020-06099-8 (Year: 2020).*
Hoda ElMaraghy, Mostafa Moussa, Optimal platform design and process plan for managing variety using hybrid manufacturing, CIRP Annals, vol. 68, Issue 1, 2019, pp. 443-446, ISSN 0007-8506, https://doi.org/10.1016/j.cirp.2019.03.025. (Year: 2019).*
Behandish et al., U.S. Appl. No. 17/069,087, filed Oct. 13, 2020.

(Continued)

*Primary Examiner* — Christopher E. Everett
(74) *Attorney, Agent, or Firm* — Mueting Raasch Group

(57) ABSTRACT

Two or more computational services are defined that each represent a respective different manufacturing capability used to partially create a target part model. A common space shared among the computational services is defined to reference the target part model and manufacturing primitives corresponding to each capability. The computational services are queried to construct a logical representation of the planning space based on intersections among the primitives. One or more process plans are formed using the different manufacturing capabilities to manufacture the part.

20 Claims, 8 Drawing Sheets

(56) References Cited

OTHER PUBLICATIONS

Behandish et al., "Automated Process Planning for Hybrid Manufacturing", arXiv.org, May 18, 2018, 15 pages.
European Patent Application No. 22186118.0; Office Action dated Jan. 26, 2023.
Hoffman et al., "Geometric interoperability via queries," 2014, *Computer-Aided Design*, 46:148-59.
Tilove, "Set Membership Classification: A Unified Approach to Geometric Intersection Problems," Oct. 10, 1980, *IEEE Transaction on Computers*, 29(10):874-83.

* cited by examiner

METHOD AND SYSTEM FOR REPRESENTATION-AGNOSTIC COMPOSITION OF HYBRID MANUFACTURING SERVICES

STATEMENT REGARDING FEDERALLY SPONSORED RESEARCH AND DEVELOPMENT

This invention was made with government support under DARPA contract HR0011-17-2-0030. The government has certain rights in the invention.

SUMMARY

The present disclosure is directed to a hybrid manufacturing meta-planner. In one embodiment, a common space is divided into a plurality of primitives, the common space including a target part model. The common space is defined within a plurality of computation services. The plurality of computational services each model a respective different manufacturing capability used to create the target part model. For each of the manufacturing capabilities, the computational services are used to compute the primitive (and/or groups of primitives) that represent the regions of the common space that can be manufactured via the respective manufacturing capabilities. Depending on the different modes of interoperability between the computational services, quantitative measures of intersections of their respective primitives are queried either directly or by means of sampling the common space and performing point membership queriers (PMC) against the primitives.

Based on responses to the queries, a logical representation of the process planning space is formed. Given cost models for each of the manufacturing capabilities and the volumes of intersections among their primitives, cost-effective or optimal process plans are formed using the different manufacturing capabilities in different orders with cost factors to obtain an as-manufactured part.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
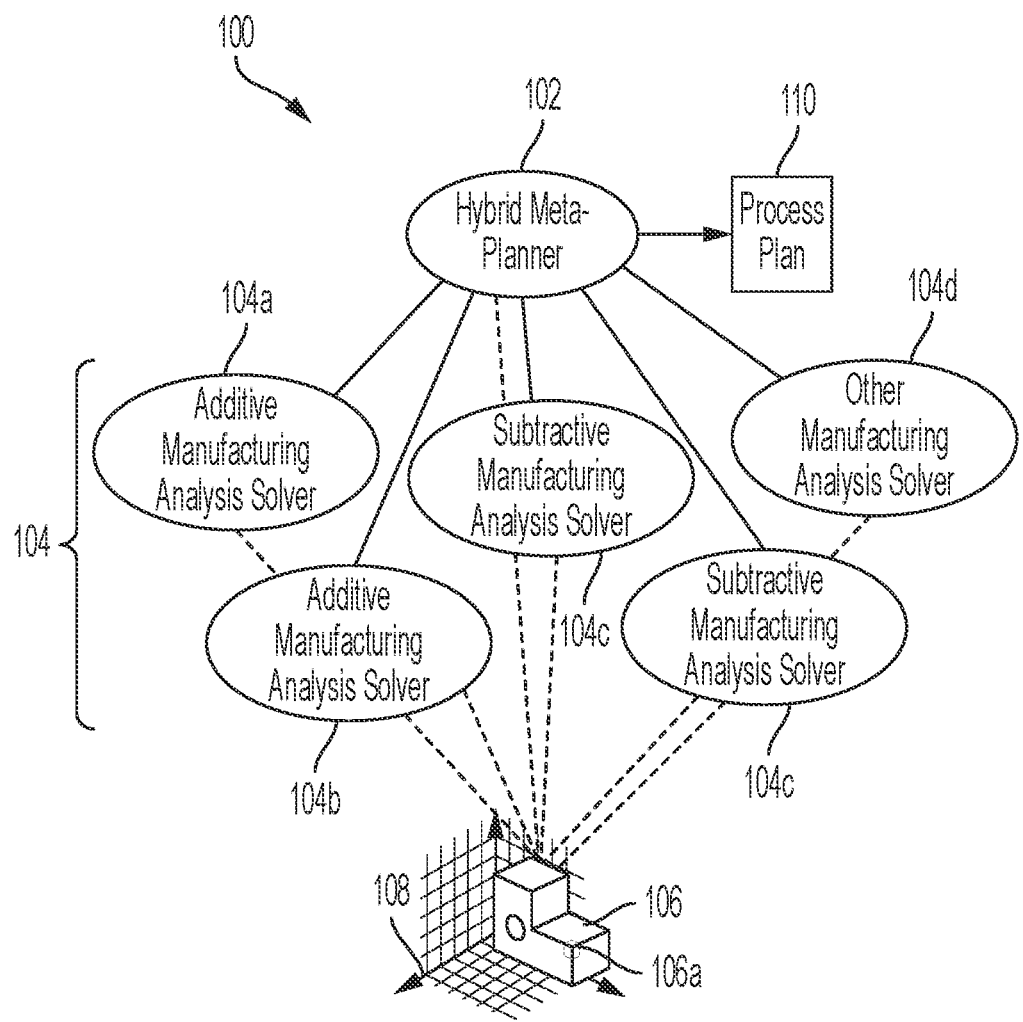
FIG. 1 is a block diagram of a system according to an example embodiment.

The present disclosure relates to hybrid manufacturing process planning. Hybrid manufacturing relates to a process of manufacturing that combines two different process types or "modalities" usually performed on distinctly different machines, such as (a) additive manufacturing (AM) including three-dimensional (3D) printing, selective laser melting/sintering, laser cladding, welding, and many others; (b) subtractive manufacturing (SM) including turning, milling, drilling, sawing, cutting, and many others; and (c) deformation-based manufacturing such as bending, etc. AM is capable of forming complex structures with customized material gradation, such as complex and efficient infill structures. SM is useful for producing high-precision mechanical parts with controlled surface roughness. Although AM affords wide freedom in customizing the internal structures of parts, SM can achieve finer precision and surface quality specifications than currently possible with AM, such as needed for functional interfaces requiring high-tolerance fit and assembly.

Historically, the manufacturing of parts from raw stock or material has involved these two distinct, albeit combinable, manufacturing processes. Fabricating a part through SM involves progressively removing or machining material from raw stock until the part has been reduced to the desired form within a specified tolerance. Raw material is often removed by turning, drilling, or milling. Fabricating a part through AM involves progressively adding or depositing material onto a part being fabricated, often by adding successive layers, until the part approximates an intended shape and size, such as used with three-dimensional (3D) printing through stereolithography (SLA), digital light projection (DLP), multi-jet modeling (MJM), fused deposition modeling (FDM), selective laser sintering (SLS), direct metal laser sintering (DMLS), binder jetting (BJ), and others.

For instance, metal AM is sometimes used in lieu of traditional metalworking, such as casting, but with more freedom in generating complex forms, to produce a near-net shape that is close enough to the final part. Functional interfaces may still be finished using SM to satisfy tolerancing and surface quality specifications. In many cases, in layer-by-layer AM processes such as fused deposition modeling (FDM), support materials are printed into the lower layers of the near-net shape, allowing the upper layers to extend beyond the lower layers' width without sagging due to gravity. This may require SM post-processing to remove the support materials. See, for example, commonly owned U.S. Pat. No. 10,359,764.

Process plans that contain unimodal manufacturing sequences of either purely AM or purely SM processes have state transitions that may be abstracted as a partial ordering (in terms of set containment) of 3D pointsets representing the physical space occupied by the evolving shape of the part (i.e., workpiece). At each intermediate state of manufacturing, the physical space occupied by the part being fabricated either increases (for AM-only sequences) or decreases (for SM only-sequences) in size, and every later state respectively either contains or is contained within the preceding states in the unimodal sequence, leading to the partial ordering. The monotonic change of state is a characteristic of unimodal (AM-only or SM-only) processes, and can be exploited for process planning as any over-filling (AM) or under-cutting (SM) would be irreversible. Every manufacturing action can be optimized independently of the others using a "greedy" criterion to approach the final state from one side in the partial ordering.

Moreover, the final outcome of the operations that abstract the effects of material deposition (AM) or removal (SM) of such sequences is insensitive to permutations, that is, same steps applied in different orders, even though the intermediate states may vary. The permutativity of unimodal (AM-only or SM-only) processes can be leveraged to perform early manufacturability tests prior to process planning. Multimodal process (combined/interleaved AM and SM) are neither monotonic nor permutative, making their process planning more challenging.

The manufacturing primitives can be defined as the geometric model of the material deposited (AM) or removed (SM) at a unit manufacturing action with a given manufacturing instrument with certain degrees of freedom (DOF). For unimodal processes, as a result of permutativity, the total material deposition (AM) or removal (SM) can be evaluated, irrespective of the order of execution of each AM or SM process within the unimodal sequence. Therefore, the manufacturability of the part can be evaluated before proceeding to computationally expensive process planning to find a specific ordered unimodal sequence of AM or SM actions. Under certain assumptions for accessibility constraints, a weaker form of early manufacturability test can be devised for multimodal processes as well, but its success depends on proper selection of primitives.

Conventionally, unimodal manufacturing sequences have been the default (and only) modality for AM-only or SM-only machine process plans. Recently, multi-tasking machines equipped with hybrid (both AM and SM) capabilities have emerged, including the Integrex i-400AM, manufactured by Yamazaki Mazak Corporation, Oguchi, Aichi Prefecture, Japan. Such hybrid machines are not restricted to unimodal sequencing of actions and offer the potential to blend arbitrary combinations of AM and SM modalities, where, for instance, an AM operation (e.g., adding a fin near-net shape) may be followed by an SM operation (finishing the fin surface) followed by an AM operation, and so on. In turn, these arbitrary multimodal sequences can result in increased manufacturing efficiency and can further expand the realm of manufacturing possibilities.

Generating process plans for arbitrary multimodal sequences in hybrid manufacturing, though, remains a challenge. The changes in the physical space occupied by a partially-manufactured part while progressing through an arbitrarily-ordered multimodal sequence of AM and SM actions lacks the monotonicity and permutativity found in unimodal sequences. As a result, the selection of primitives is more flexible, hence more challenging as they no longer need to approach the final state from one side of a partial ordering (e.g., using the greedy method) and can intelligently include over-filling (AM) and under-cutting (SM) to be reversed by subsequent actions of opposite modality. Moreover, the order of execution of the AM and SM actions matters, and full process planning for any ordered multimodal sequence appears necessary because the constituent AM and SM actions cannot be evaluated out of sequence. This result comes at potentially significant computational expense due to the enormity of the state transition problem space that needs to be explored. Moreover, the manufacturability of the part could not be guaranteed without first completing the process planning.

Another key challenge with process simulation and process planning for hybrid manufacturing is that different manufacturing processes may require dramatically different representations (of part geometry, material properties, process parameters, quality metrics, etc.) and domain knowledge built into such representations and algorithms that operate on them. In a hybrid setting, making the software tools that support each process interoperate with each other can be challenging, as representation conversation can be lossy and produce accumulating errors. The simple query-based approach presented herein allows these services to agree on basic semantics such as pairwise intersection queries, point membership classification (PMC) (i.e., inclusion) queries, and pointwise material property queries, if applicable. In different embodiments, such queries can be extended from point to set membership classification (SMC) (i.e., containment) queries, where the sets can be various spatial elements (e.g., curve segments, surface patches, and volume chunks) representing higher dimensional spatial neighborhoods over which integral shape or material properties are of interest.

Taking advantage of complex geometries and material distributions enabled by AM as well as the precision and surface quality enabled by SM requires developing advanced software tools to simulate HM processes by composing various computer-aided technologies (CAx) such as computer-aided design (CAD), engineering and simulation (CAE), and manufacturing and process planning (CAM/CAPP) software tools. However, the existing CAx tools use a bewildering variety of representations and algorithms for geometry, material, and process specifications and computations. Simulating different manufacturing processes requires different representations and algorithms, not to mention extensive domain knowledge and expertise, acquired over years of experience, careful documentation, and iterative calibration, built into expert software services. The vendors that provide CAx services do not always share the inner working of the software, and even when they do, services provided by different vendors rarely interoperate. Composing CAx services for HM process planning requires developing pairwise interfaces using representation conversions (which introduce errors and model degradation) or building large monolithic systems that standardize on a single representation.

Cloud-based and service-oriented architectures have shown great promise as an environment to compose modular services in other industries. Although product lifecycle management (PLM) software are still catching up, new technologies and business models are emerging based on microservices. See, for example, U.S. patent application Ser. No. 15/849,745, filed Dec. 21, 2017, now U.S. Publication No. 20190197448, which is hereby incorporated by reference. Particularly, "black-box" composition models based on standardized interfaces are appealing, as they respect proprietary boundaries.

This disclosure relates to a method and system for representation-agnostic composition of computational services for manufacturing simulation and process-planning. These computational services may include computer-aided design (CAD), computer-aided engineering (simulation/analysis) CAE computer-aided manufacturing (CAM), computer-aided process planning (CAPP), topology optimization (TO), etc., and are referred to herein as CAx "services." An independent and generic computing service, called hereafter as the "meta-planner" or "orchestrator," queries the CAx services to construct logical representations that are universal as opposed to geometric, material, and process representations or domains of expertise that are specific to individual services and may not be public, e.g., may be proprietary, and may not be easy to replicate, interpret, or compute with due to a lack of documentation or standardization. The logical representation is used independently for manufacturability analysis and process planning.

The meta-planner may have access to an arbitrary number of CAx services, e.g., software tools provided by a variety of vendors, each focused on simulating one or more manufacturing "capabilities" including AM/SM processes such as 3D printing, machining, etc. Each CAx service may be called by providing it with the proper input, which may include the geometry, material properties, tolerance specifications, and process parameters. The CAx service uses its internal representations and algorithms, which may be proprietary, to define a set of manufacturing "actions." Each manufacturing action may be viewed as a computer simulation of how the matter is manipulated by a manufacturing capability, e.g., what is deposited/removed by AM/SM, how the material properties changes, etc. The system interprets the outputs of the CAx services, including different AM/SM simulation tools, in terms of manufacturing "primitives" using a common abstraction, e.g., mathematical pointsets or geometric models in two- or three-dimensional space (2D or 3D), possibly supporting one or more mathematical fields that represent material properties. However, an explicit representation of the primitive need not be produced outside of the computational service, and remains within the service viewed as a black-box. These primitives represent a model of the additive or subtractive region of influence (ROI) by each manufacturing capability, embodied within a manufacturing service.

The system also identifies different modes or levels of interoperability among the host of available CAx services, based on which it determines the proper mechanisms, such as pairwise intersection tests or individual point membership queries described below, to obtain the necessary information for constructing the logical representation. A "manufacturing state space" (MSS) is constructed, explicitly or implicitly, as the discrete set of all possible logical forms.

Depending on the interface specifications of the individual services, the MSS is built by applying basic operations (e.g., pairwise intersection queries) that delegate geometric operations to the CAx services, if they can directly talk to each other. In one possible embodiment, for example, a pair of interoperating CAD services may be asked whether the geometric models (e.g., primitives or ROIs) held by them intersect or not, and a binary (YES/NO) answer is expected, without a need to know the explicit geometry of the intersection domain.

For CAD services that cannot interoperate at that level due to inability to interpret each other's representations or answer logical queries among themselves, the system samples the common 2D or 3D space occupied by the geometric models and asks the CAD service to answer the most basic queries such as inclusion (in/out) or point membership classification (PMC) (in/on/out) against the geometric representations held internally by the CAD services, viewed as black-box models, to reason about logical relations (e.g., pointwise intersection).

Other embodiments are possible in which intersection tests and inclusion queries on geometric models (e.g., primitives or ROIs) within CAD systems are replaced by analytical combinations of material fields or value queries against material distribution models or physical properties held by other CAx representations. Once the logical representation is created, manufacturability analysis and process planning, e.g., deciding whether the cheapest sequence of AM/SM actions exist to build a given part and finding the most cost-effective sequence, respectively, is performed directly on the logical representation, using algorithms that do not need to know anything about expert CAx representations. An example of such a scheme is described in U.S. patent application Ser. No. 17/069,087, filed Oct. 13, 2020, entitled "System and Method for Determining Manufacturability and Process Planning for Hybrid Manufacturing Using Symbolic, Logical, and/or Combinatorial Representations," which is hereby incorporated by reference.

Although CAx services may not directly interoperate (e.g., communicate through commonly understood representations with consistent syntax and semantics), they may support basic pointwise queries with universally accepted semantics such as inclusion (in/out) point membership classification (PMC) (in/on/out), signed or unsigned distance to the geometric boundaries, material composition (e.g., 70% steel and 30% titanium), and so on, if applicable. The meta-planner samples the common space with a number of points expressed in a common coordinate system and accumulates the pointwise tests against all primitives held by two or more CAD services to construct a logical representation, e.g., if there exists at least one point that belongs to both A and B denoting specialized geometric representations of two manufacturing ROIs held by two different services, then A and B intersect. If the two representations are held by the same CAD service or different CAD services that can resolve intersection queries among themselves, there is no need for such sampling-based approximation by the meta-planner. Similarly, the meta-planner may ask two CAE services to integrate field properties (e.g., material composition) over the intersection regions of the ROIs held by each CAE service, or sample the common space and approximate the integral as a weighted sum of queried field values at those points.

In FIG. 1, a block diagram shows a system 100 with a hybrid manufacturing meta-planner (also referred to as an orchestrator) 102 according to an example embodiment. Two or more CAx services 104 each model a respective manufacturing capability used to create a target part model 106 defined within a common space 108. Services 104a-104d are shown as a non-limiting example of the CAx services. The common space is defined consistently within all of the CAx services and is addressable using a commonly agreed-upon coordinate system. The meta-planner 102 is operational on a computer and is configured to orchestrate the interactions among a number of CAx services 104, particularly to request each CAx service to construct an internal representation of the target part model 106 and produce one or more manufacturing primitives located within the common space 108.

Each CAx service may use its own expert knowledge base, proprietary representations and algorithms, and hidden reasoning technology to generate the primitives. The resulting primitive(s) held by one CAx service using an internal representation may not be visible to the external clients such as the meta-planner or other CAx services; however, the external clients may query those representations for certain properties. The meta-planner produces a logical representation of the manufacturing state space (MSS) based on intersection queries among the primitive and their complements, as described in the Ser. No. 17/069,087 application noted above.

The intersection queries are either delegated to the groups of two or more interoperating CAx services that can test whether their respective primitives overlap, or performed by sampling the common space with points and testing if an intersection occurs at those points by queries their inclusion in the primitive among non-interoperating CAx services. Based on responses to these queries, the meta-planner 102 may test for manufacturability and form process plans 110 using the different manufacturing capabilities represented and simulated by the individual CAx services to obtain an as-manufactured part.

The different queries shown in FIG. 1 can be used to prepare hybrid manufacturing process plans 110 that interleaves different (e.g., additive and subtractive) manufacturing actions. By abstracting away the process-specific computations such as CNC machine degrees of freedom (DOF), tool shape, minimum feature size (e.g., feature 106a), support structure constraints, accessibility constraints, etc., AM/SM actions can be combined as Boolean formula with geometric shapes of arbitrary complexity. Regardless of geometric and physical complexities of each AM/SM action handled by individual CAx services, manufacturability analysis and process planning can be cast into purely logical, symbolic, or combinatorial reasoning as described in the Ser. No. 17/069,087 application noted above.

Figure 2:
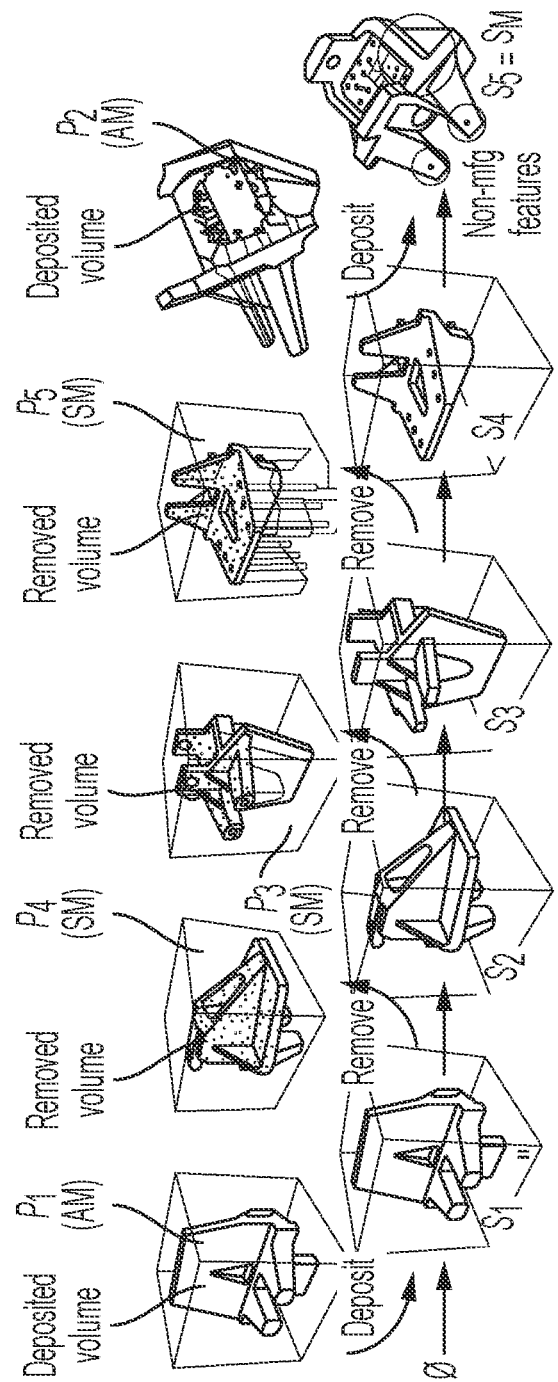
FIG. 2 is a view showing a hybrid manufacturing process, with interleaved additive and subtractive manufacturing actions, according to an example embodiment.

An example of the use of computing primitives is shown in the diagram of FIG. 2. An as-manufactured part model SM can be constructed with minimal deviation from the as-designed part using additive primitives $P_1$ and $P_2$, and subtractive primitives $P_3$, $P_4$, and $P_5$. The operation shown in FIG. 2 can be represented as $S_1=P_1$; $S_2=S_1 \cap P_4$; $S_3=S_2 \cap P_3$; $S_4=S_3 \cap P_5$; and $S_M=S_5=S_4 \cup P_2$. The meta-planner (orchestrator) orders the actions such that (a) for every point inside the target part model, every SM primitives including that point is preceded by at least one AM primitive including that point; and (b) for every point outside the target part model, every AM primitives including that point is preceded by at least one SM primitive including that point. In one embodiment, the points ay be collected into a finite number of "atomic" regions in the common space, described in the Ser. No. 17/069,087 application noted above.

In this particular embodiment, the use of primitives reduces manufacturing problems to purely geometric reasoning, although may neglect some process-specific nuances in favor of unification. Other embodiments in which effective material properties are abstracted at the primitive-level, e.g., in terms of spatial material property fields that can be queried in a pointwise fashion, regardless of the process-specific physics and chemistry that lead to such properties, can be envisioned. For example, each AM primitive may include a material property field defined over the shape. The meta-planner (orchestrator) orders the actions such that (a) for every point inside the target part model, every SM primitives including that point is preceded by at least one AM primitive including that point with a material property that matches the target value (within a prespecified tolerance interval); and (b) for every point outside the target part model, every AM primitives including that point is preceded by at least one SM primitive including that point.

A simulation of all AM/SM actions that may appear in a hybrid plan can benefit from domain expertise, physical simulation, and data that is beyond the reach of a single research or commercial group. In addition, rasterized representations (e.g., dense voxels) may be used to enable fast C-space and morphological operations on GPUs for computing the primitives, and to achieve easy spatial addressability for classifying canonical intersection terms, also called manufacturing "atoms." While this is a reasonable first choice, voxelization has some limitations such as loss of feature semantics and surface precision, need for resampling after rotations, and large memory overhead, among others. Moreover, depending on any single representation scheme impairs interoperability with the existing CAD/CAM and material modeling systems based on a variety of other representations such as feature-based ontologies, B-reps, CSG, G-code coordinates, point clouds, implicit models as levelset functions, subdivision surfaces, and others.

The hybrid meta-planner can combine AM/SM actions based on the principles described below. Process planning is viewed as service-oriented composition of a host of available AM/SM capabilities through formally specified interfaces. Each capability is provided by a black box service whose inner workings based on its choice of representations, algorithms, and databases are not necessarily transparent for proprietary or technical reasons and can change over time as new technologies arise. Computing manufacturing primitives, using geometric reasoning, physical simulation, or data-driven learning, are delegated to expert systems of various representations. The meta-planner communicates with the services through simple queries, defined with respect to agreed-upon semantics (e.g., 3D workspace with a world coordinate system). The meta-planner constructs its own logical representation based on the response of the system to the queries and proceeds to hybrid (multi-modal) manufacturability analysis and process planning solely based on the logical information, assuming that each service has already tested for its own (uni-modal) manufacturability analysis.

A meta-planner will use common semantics to define specifications of queries. At a minimum, the services may acknowledge a background "canvas" (e.g., a sampled set of points on a grid submerging the workpiece) with a common coordinate frame. These frames should encompass virtual space that can reference the same physical space (e.g., a volume that encompasses the part), although the different services may use different conventions that can be accounted for by the meta-planner. For example, the services may use different units (e.g., SI units, English units), different coordinate systems (e.g., Cartesian, cylindrical, spherical), different levels of numeric precision, etc., all of which have known conversions. They all will be configured to model deposition/removal of material is by inclusion/exclusion of a given point in that space, respectively. Sometimes, the services can interoperate at a higher-level. For instance, the services may be able to handle pairwise intersection queries among each other without sampling, which can be leveraged.

Figure 3:
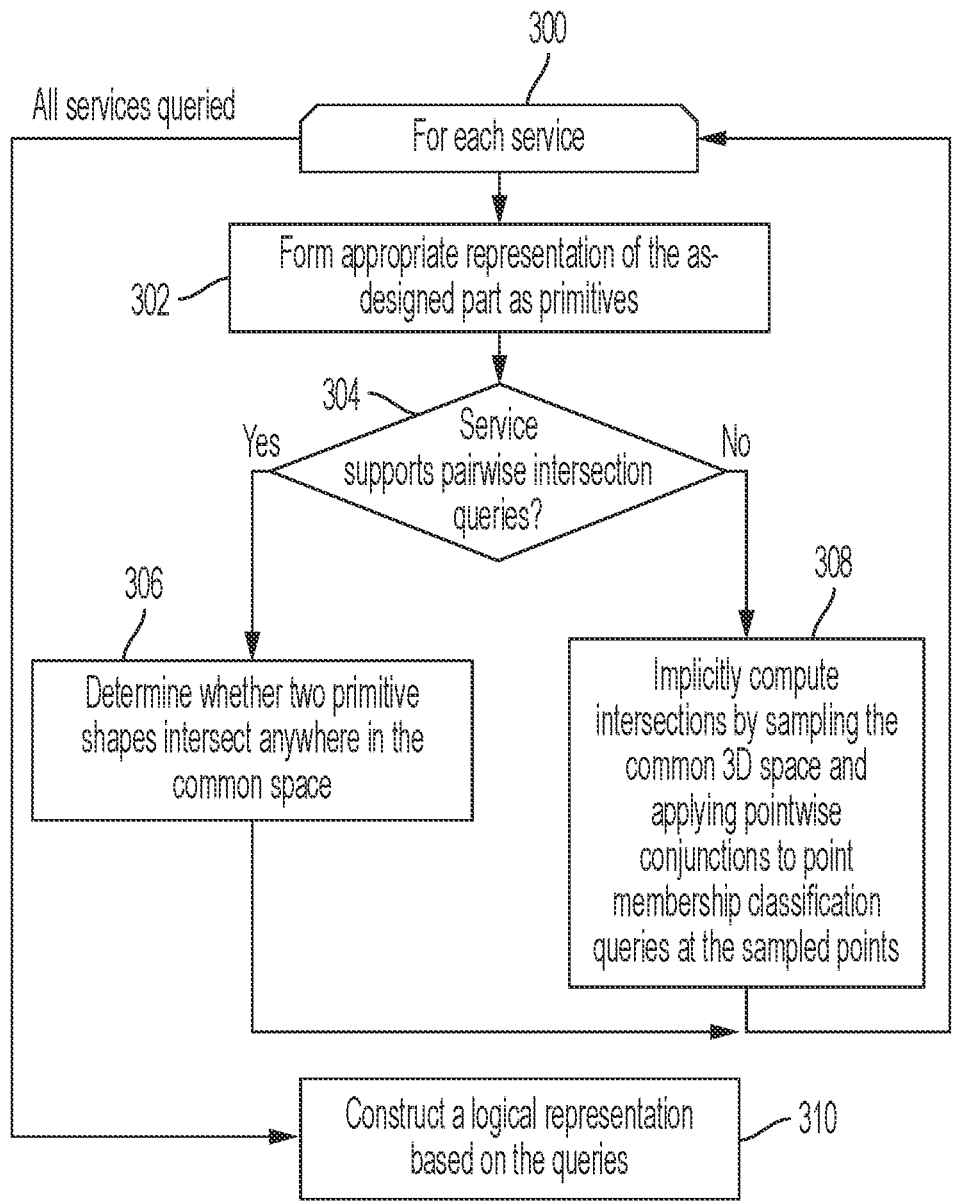
FIG. 3 is a flowchart of a method according to an example embodiment.

In FIG. 3, a flowchart shows an algorithm for use with a meta-planner according to an example embodiment. This algorithm constructs a logical representation from a finite number of queries from a set of available hybrid (e.g., AM/SM) simulation services. The meta-planner works with two more services, as indicated by loop limit 300. Each of the services forms 302 an appropriate representation of the as-designed part (geometry, topology, materials, tolerances, etc.). This can be done by conversion of representations or in a query-based fashion, e.g., each service is only queried for the relevant information for it to simulate one manufacturing operation.

The meta-planner queries the services for the outputs of their computations, generalizing the notion of manufacturing "primitives." Note that the meta-planner does not have a full picture of each primitive but only asks questions about it. Two scenarios are possible as indicated by block 304. If block 304 returns YES, the service support pairwise intersection queries. In such a case, it is sufficient that the service provides YES/NO answers to whether the two shapes intersect anywhere in the common space, as indicated by block 306. For example, two CAx systems based on non-uniform rational basis splines (NURBS) can rapidly decide if the primitives they author intersect or not.

If the services do not support pairwise intersection queries (block 304 returns NO), their intersections are implicitly computed 308 by the meta-planner by sampling the common 3D space (adaptively, if possible) and applying pointwise conjunctions (AND gates) to point membership classification (PMC) queries to probe coordinates of the sampled points. In general, the processing of block 306 is preferred over that of block 308 for its precision, reliability, and sometimes speed if the authoring systems are optimized for Boolean operations or collision detection, but block 308 processing is more generally applicable to authoring systems with minimal PMC-based interoperability.

Based on query responses, the meta-planner constructs 310 a logical representation. For geometric representation, the representation may be a truth table whose entries encode the inclusion/exclusion of each manufacturing atom, obtained as groups of queried points with identical PMC across all services or directly from pairwise intersection queries on the services. The representation may be a disjunctive normal form (DNF) encoding which canonical intersection terms are included/excluded in the final as-manufactured shape from some combination of AM/SM actions, which is interchangeable with the as-designed shape. The representation may be a conjunctive normal form (CNF) encoding partial ordering constraints on the order of appearance of AM/SM actions in the plans that can potentially generate an as-manufactured shape interchangeable with the as-designed shape. The representation may be a statement of necessary and sufficient conditions for manufacturability by some combination of primitives with or without prescribed constraints on their ordering.

It is possible that multiple process plans corresponding to different orderings of the manufacturing operations corresponding to the primitives lead to the desired target part model, which may include geometry (with or without material properties). To pick the most cost-effective process plan(s), the meta-planner (orchestrator) may add cost models to its logical representation. For example, the "atomic" intersection regions between the primitives may be associated with their volume, whose cost of addition or removal may be quantified by multiplying the volume by the cost-per-unit-volume of the AM/SM actions that add/remove them, as described in the Ser. No. 17/069,087 application noted above. For pairs of computational services can answer intersection queries between their primitives (YES/NO answers), if they can also provide the volume of that intersection, the volume can be used for cost computations by the meta-planner (orchestrators). Otherwise, the volume can be approximately computed by sampling the common space with uniform or pseudo-uniform (e.g., random) distribution and counting the number of points that are included (according to PMC queries) in both primitives.

Figure 4:
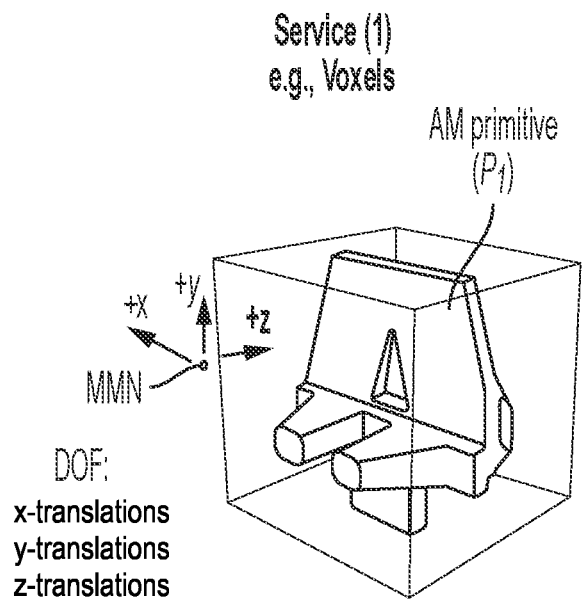
FIGS. 4 and 5 are drawings showing three-dimensional (3D) representations of manufacturing primitives for one additive and one subtractive manufacturing capabilities, respectively, constructed by two different computational services according to an example embodiment.
Figure 5:
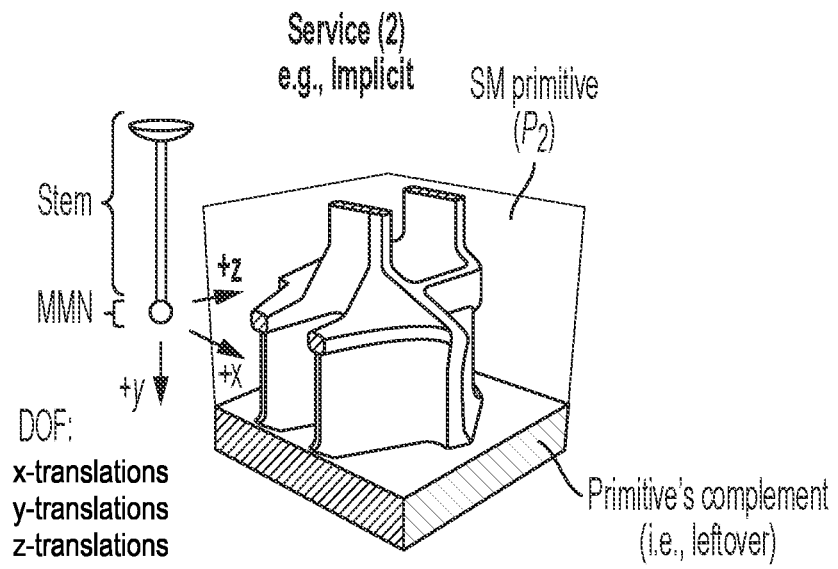
Figure 6:
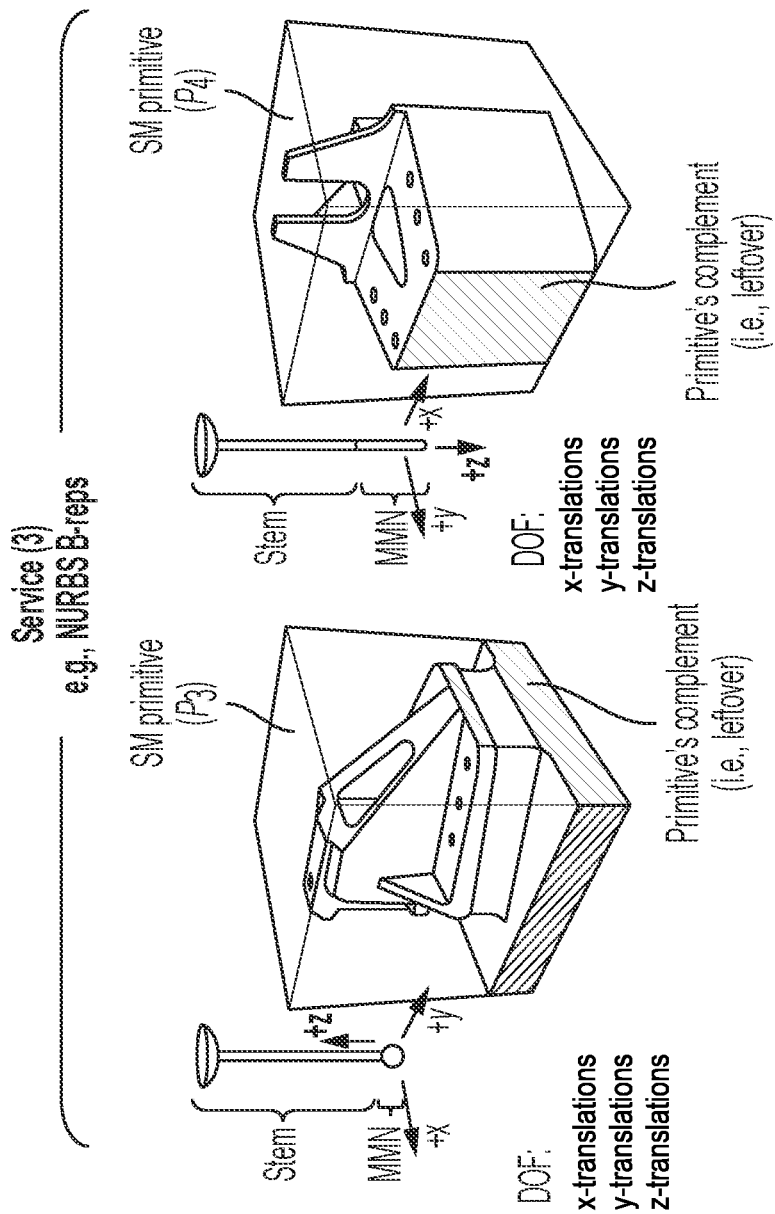
FIG. 6 is a drawing showing 3D representations of manufacturing primitives for two subtractive manufacturing capabilities, constructed by the same computational service according to an example embodiment.
Figure 7:
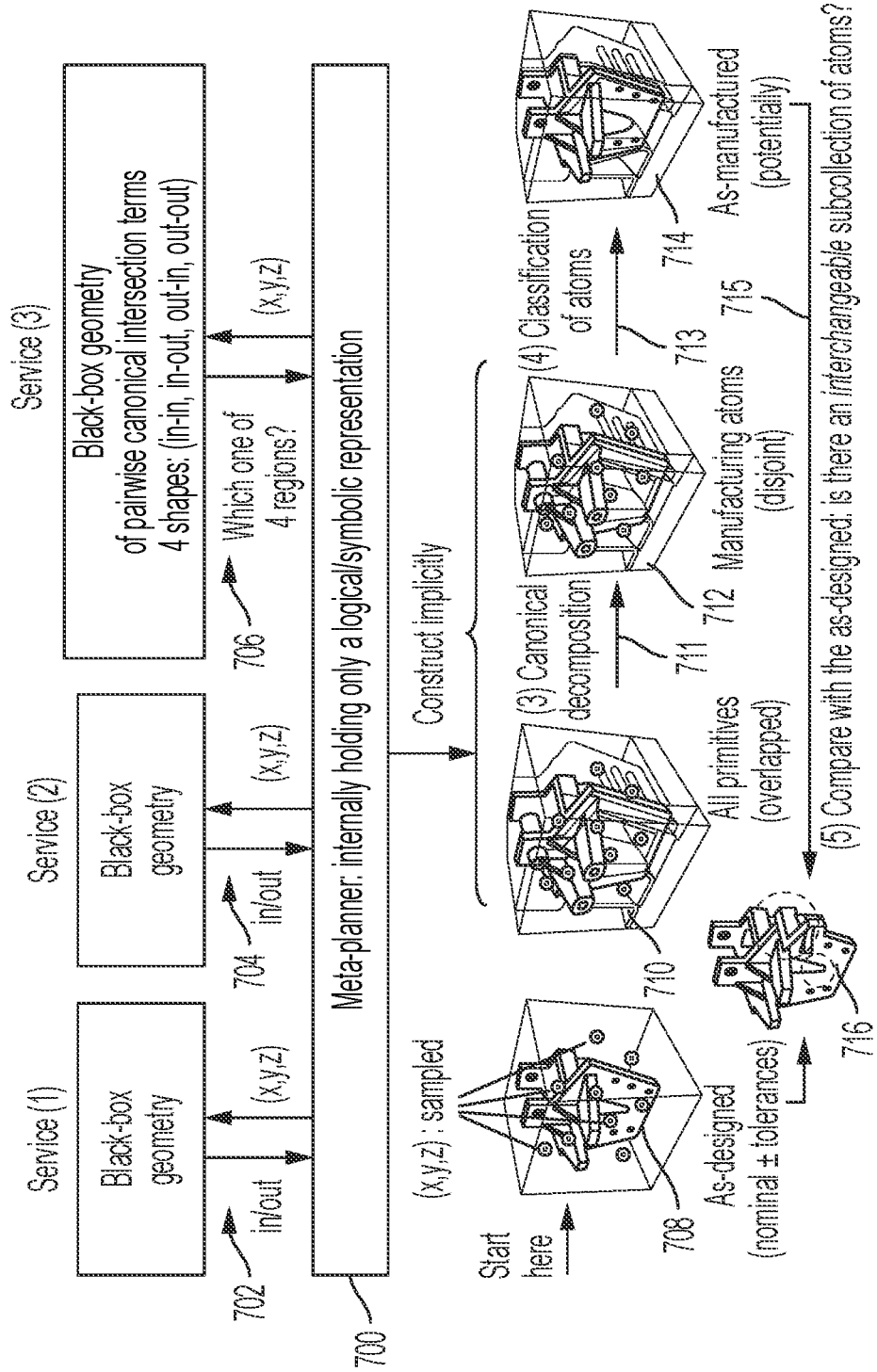
FIG. 7 is a diagram showing operation of a hybrid manufacturing meta-planner according to an example embodiment used with the services shown in FIGS. 4-6.

In FIGS. 4-6 diagrams show three different Services (1)-(3) that are used to illustrate the operations of an example meta-planner (orchestrator), which is shown in FIG. 7. Service (1) is shown in FIG. 4. Service (1), which is an AM planner, and utilizes an MMN that is translated in three-dimensional space. Service (2) shown in FIG. 5 is an SM planner, and also utilizes an MMN that is translated in three-dimensional space. Note that the MMN in Service (2) represents material removed, such that the manufactured part is a complement of the MMN primitive. Service (3) shown in FIG. 6 is also an SM planner, and in this case supports NURBS representations.

As seen in FIG. 7, a meta-planner (orchestrator) 700 makes queries 702, 704, 706 to the respective Services (1)-(3) regarding an as-designed part 708. All primitives are overlapped in representation 710 and a canonical decomposition 711 is performed to create a disjoint set of manufacturing atoms 712. The atoms are classified 713 to form an as-manufactured representation 714, and this is compared 715 with the as-designed part as indicated by image 716.

Figure 8:
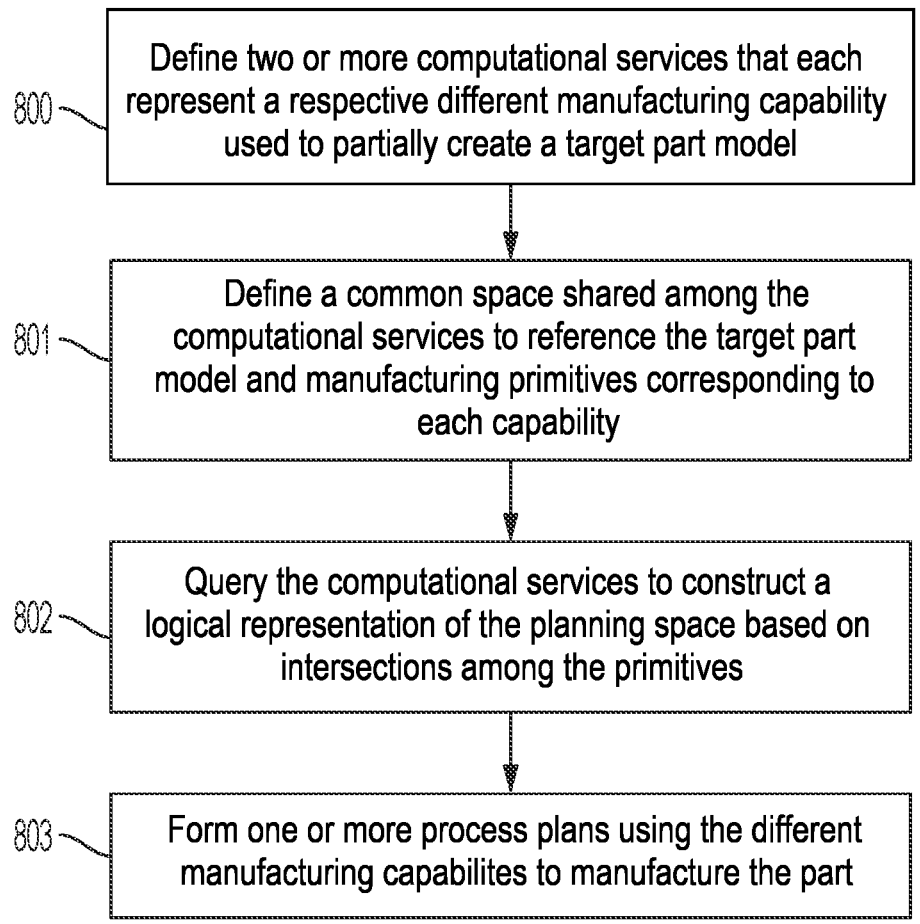
FIG. 8 is a flowchart showing a method according to an example embodiment.

In FIG. 8, a flowchart shows a method according to an example embodiment. The method involves defining 800 two or more computational services that each represent a respective different manufacturing capability used to partially create a target part model. The defining 800 may occur by manually selecting the services via an orchestrator, and/or other automated processes may be used, e.g., network service discovery. A common space shared among the computational services is defined 801 to reference the target part model and manufacturing primitives corresponding to each capability. The computational services are queried 802 to construct a logical representation of the planning space based on intersections among the primitives. One or more process plans are formed 803 using the different manufacturing capabilities to manufacture the part.

Figure 9:
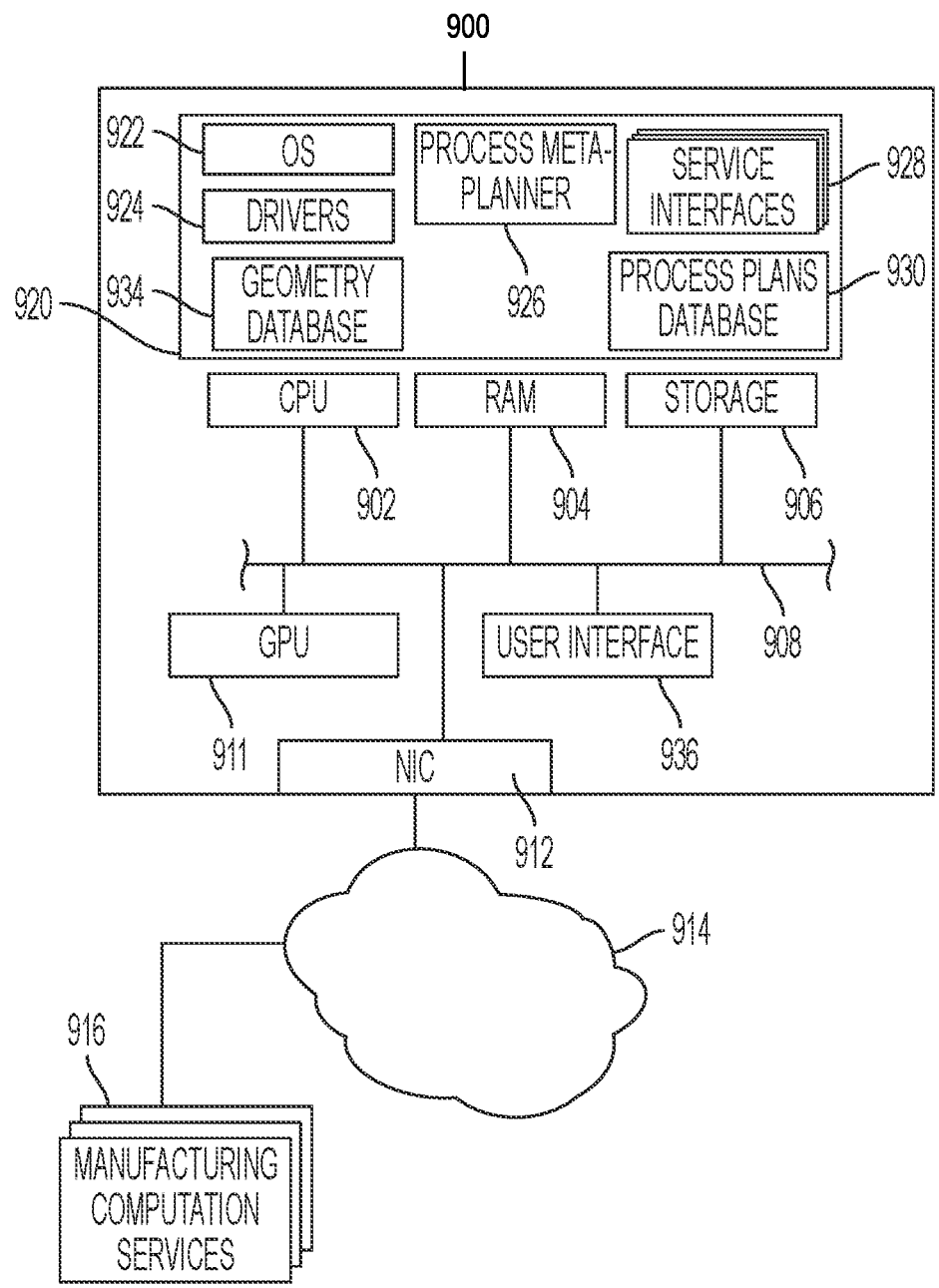
FIG. 9 is a block diagram of an apparatus according to an example embodiment.

The methods and processes described above can be implemented on computer hardware, e.g., workstations, servers, as known in the art. In FIG. 9, a block diagram shows an apparatus 900 that may be used to implement methods according to an example embodiment. The apparatus 900 includes one or more processors 902 such as a central processing unit, co-processor, digital signal processor, etc. The processor 902 is coupled to memory, which may include both random access memory 904 and persistent storage 906, via one or more input/output busses 908. Other general-purpose or special-purpose hardware may be coupled to the bus 908, such as graphics processing unit (GPU) 911 and network interface 912. Note that the functions of the apparatus 900 described below may be implemented via multiple devices, e.g., via client-server arrangement, clustered computing, cloud computing, etc.

The network interface 912 facilitates communications via a network 914, using wired or wireless media, with two or more computation services 916 that each model a respective different manufacturing capability system. The computation services 916 may include network interfaces (e.g., network service that implements programmatically accessible functions) that facilitate making generic queries (e.g., inclusion, exclusion, intersection) about a part design within a common space modeled by all of the services 916. Data may also be transferred to the services 916 using non-network data transfer interfaces, e.g., via portable data storage drives, point-to-point communication, etc. Further, one or more of the services 916 may be running locally on the apparatus 900, such that an appropriate local data transfer interface (e.g., shared memory, pipes, sockets, etc.) can be used to make the queries.

The apparatus 900 includes software 920 such as an operating system 922 and drivers 924 that facilitate communications between user-level programs and the hardware. The software 920 includes a process meta-planner (orchestrator) 926 that divides a target part model (e.g., accessible via geometry database 934) into a plurality of primitives each located within the common space parameterized by a common agreed-upon (i.e., global or "world") coordinate system. For each of the primitives, the meta-planner 926 queries the computation services to determine if the primitive can be manufactured via the respective computational services. Based on responses to the queries, the meta-planner 926 forms a process plan using the different manufacturing capabilities to obtain an as-manufactured part. The process plan may be stored in a plans database 930. The various planners may be accessed via user interface 936, e.g., computer monitor, mouse, keyboard, graphics card, graphical user interface software, etc.

The meta-planner 926 may utilize a plurality of service interfaces 928 that enable the meta-planner 926 to communicate with the different services 916. For example, the service interfaces 928 may be implemented as a factory method pattern that can instantiate any of the available service interfaces as needed. This enables extending the meta-planner 926 to talk to additional services as interfaces to such services become available. A factory pattern also streamlines the instantiation of the correct version of a target service, as programming interfaces may change with different versions.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A system, comprising:
    two or more computational services that each represent a respective different manufacturing capability used to partially create a target part model of a part, each of the two or more computational services responding to queries on manufacturing primitives, the manufacturing primitives representing additive or subtractive region of influence within a space of the target part model; and
    an orchestrator operational on a computer and configured to:
        define a common space shared among the computational services to reference the target part model and the manufacturing primitives corresponding to each capability;
        submit the queries to the computational services and use responses to the queries to construct a logical representation of a planning space based on intersections among the manufacturing primitives that satisfy a manufacturability test; and
        form one or more process plans using the different manufacturing capabilities to manufacture the part according to the planning space.

2. The system of claim 1, wherein the orchestrator additionally queries or computes quantitative measures of the intersections and cost factors to determine cost-effective or optimal process plans to manufacture the part.

3. The system of claim 1, wherein the two or more computational services determine the intersections based on delegation by the orchestrator.

4. The system of claim 3, wherein the target part model additionally comprises requirements for material properties and the orchestrator queries the computational services for material properties associated with intersection regions.

5. The system of claim 1, wherein the intersections are implicitly computed by the orchestrator by sampling the common space and applying pointwise conjunctions to membership classification queries at sampled coordinates.

6. The system of claim 5, wherein the target part model additionally comprises requirements for material properties and the orchestrator queries the computational services for material properties associated with intersection regions or probes the sampled coordinates for the material properties.

7. The system of claim 1, wherein the orchestrator is further configured to query the two or more computational services to determine support for pairwise intersection queries, and in response to a queried service supporting the pairwise intersection queries, the queried service provides yes/no answers to whether shapes intersect in a common space, otherwise the orchestrator submits point membership classification queries to the queried service.

8. The system of claim 1, wherein forming the process plan comprises forming a truth table that encodes an inclusion or exclusion of each of the primitives, entries of the truth table obtained as groups of queried points with identical point membership classification responses across all of the computational services or directly from pairwise intersection queries on the computational services.

9. The system of claim 1, wherein forming the process plan comprises encoding a disjunctive normal form in which canonical intersection terms are included or excluded in an as-manufactured shape from some combination of additive manufacturing and subtractive manufacturing actions such that the as-manufactured shape is interchangeable with the target part model.

10. The system of claim 1, wherein forming the process plan comprises encoding a conjunctive normal form of partial ordering constraints on the order of appearance of additive manufacturing and subtractive manufacturing actions in the process plan that can generate an as-manufactured shape interchangeable with the target part model.

11. A method, comprising:
defining two or more computational services that each represent a respective different manufacturing capability used to partially create a target part model of a part, each of the two or more computational services responding to queries on manufacturing primitives, the manufacturing primitives representing additive or subtractive region of influence within a space of the target part model;
defining a common space shared among the computational services to reference the target part model and the manufacturing primitives corresponding to each capability;
submitting the queries to the computational services and using responses to the queries to construct a logical representation of a planning space based on intersections among the manufacturing primitives that satisfy a manufacturability test; and
forming one or more process plans using the different manufacturing capabilities to manufacture the part according to the planning space.

12. The method of claim 11, further comprising additionally querying or computing quantitative measures of the intersections and cost factors to determine cost-effective or optimal process plans to manufacture the part.

13. The method of claim 11, wherein the two or more computational services determine the intersections.

14. The method of claim 13 wherein the target part model additionally comprises requirements for material properties, the method further comprising querying the computational services for material properties associated with intersection regions.

15. The method of claim 11, wherein the intersections are implicitly computed by sampling the common space and applying pointwise conjunctions to membership classification queries at sampled coordinates.

16. The method of claim 15, wherein the target part model additionally comprises requirements for material properties, the method further comprising querying the computational services for material properties associated with intersection regions or probing the sampled coordinates for the material properties.

17. The method of claim 11, further comprising querying the two or more computational services to determine support for pairwise intersection queries, and in response to a queried service supporting the pairwise intersection queries, receiving from the queried service yes/no answers to whether shapes intersect in a common space, otherwise submitting point membership classification queries to the queried service.

18. The method of claim 11, wherein forming the process plan comprises forming a truth table that encodes an inclusion or exclusion of each of the primitives, entries of the truth table obtained as groups of queried points with identical point membership classification responses across all of the computational services or directly from pairwise intersection queries on the computational services.

19. The method of claim 11, wherein forming the process plan comprises encoding a disjunctive normal form in which canonical intersection terms are included or excluded in an as-manufactured shape from some combination of additive manufacturing and subtractive manufacturing actions such that the as-manufactured shape is interchangeable with the target part model.

20. The method of claim 11, wherein forming the process plan comprises encoding a conjunctive normal form of partial ordering constraints on the order of appearance of additive manufacturing and subtractive manufacturing actions in the process plan that can generate an as-manufactured shape interchangeable with the target part model.

* * * * *